US009202460B2

(12) United States Patent
Chang

(10) Patent No.: US 9,202,460 B2
(45) Date of Patent: Dec. 1, 2015

(54) METHODS AND APPARATUS TO GENERATE A SPEECH RECOGNITION LIBRARY

(75) Inventor: Hisao M. Chang, Cedar Park, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 1880 days.

(21) Appl. No.: 12/120,369

(22) Filed: May 14, 2008

(65) Prior Publication Data

US 2009/0287486 A1 Nov. 19, 2009

(51) Int. Cl.
| | |
|---|---|
| G10L 13/04 | (2013.01) |
| G10L 13/06 | (2013.01) |
| G10L 15/06 | (2013.01) |
| G10L 13/02 | (2013.01) |
| G06F 17/27 | (2006.01) |
| G06F 17/21 | (2006.01) |

(52) U.S. Cl.
CPC ............... *G10L 15/063* (2013.01); *G10L 13/04* (2013.01); *G10L 13/06* (2013.01); *G06F 17/21* (2013.01); *G06F 17/27* (2013.01); *G10L 13/02* (2013.01)

(58) Field of Classification Search
USPC ................. 704/200–203, 231–257, 270–278, 704/E15.001–E15.05, E11.001–E11.007; 379/52, 67.1–88.28, 110.01; 382/309–311, 325; 348/61, 461–468, 348/552
See application file for complete search history.

(56) References Cited

U.S. PATENT DOCUMENTS

| | | | | |
|---|---|---|---|---|
| 5,268,990 | A * | 12/1993 | Cohen et al. | 704/200 |
| 5,319,552 | A * | 6/1994 | Zhong | 715/262 |
| 5,822,731 | A * | 10/1998 | Schultz | 704/270.1 |
| 5,835,667 | A * | 11/1998 | Wactlar et al. | 386/241 |
| 5,839,104 | A * | 11/1998 | Miller et al. | 704/251 |
| 5,933,804 | A * | 8/1999 | Huang et al. | 704/244 |
| 5,938,447 | A * | 8/1999 | Kirksey | 434/169 |
| 6,064,959 | A * | 5/2000 | Young et al. | 704/251 |
| 6,078,885 | A * | 6/2000 | Beutnagel | 704/258 |
| 6,172,675 | B1 * | 1/2001 | Ahmad et al. | 715/251 |
| 6,236,965 | B1 * | 5/2001 | Kim et al. | 704/254 |
| 6,243,713 | B1 * | 6/2001 | Nelson et al. | 1/1 |

(Continued)

FOREIGN PATENT DOCUMENTS

| | | |
|---|---|---|
| GB | 2 405 018 A | 2/2005 |
| GB | 2405018 | 2/2005 |
| WO | 2005048587 | 5/2005 |

*Primary Examiner* — Pierre-Louis Desir
*Assistant Examiner* — David Kovacek
(74) *Attorney, Agent, or Firm* — Guntin & Gust, PLC; Joseph Hrutka

(57) ABSTRACT

Methods and apparatus to generate a speech recognition library for use by a speech recognition system are disclosed. An example method comprises identifying a plurality of video segments having closed caption data corresponding to a phrase, the plurality of video segments associated with respective ones of a plurality of audio data segments, computing a plurality of difference metrics between a baseline audio data segment associated with the phrase and respective ones of the plurality of audio data segments, selecting a set of the plurality of audio data segments based on the plurality of difference metrics, identifying a first one of the audio data segments in the set as a representative audio data segment, determining a first phonetic transcription of the representative audio data segment, and adding the first phonetic transcription to a speech recognition library when the first phonetic transcription differs from a second phonetic transcription associated with the phrase in the speech recognition library.

18 Claims, 6 Drawing Sheets

(56) References Cited

U.S. PATENT DOCUMENTS

| | | | |
|---|---|---|---|
| 6,388,714 B1 | 5/2002 | Schein | |
| 6,389,394 B1* | 5/2002 | Fanty | 704/249 |
| 6,442,518 B1* | 8/2002 | Van Thong et al. | 704/235 |
| 6,490,557 B1* | 12/2002 | Jeppesen | 704/235 |
| 6,500,006 B2* | 12/2002 | Wakamoto | 434/156 |
| 6,505,153 B1* | 1/2003 | Van Thong et al. | 704/211 |
| 6,611,803 B1 | 8/2003 | Furuyama | |
| 6,684,185 B1* | 1/2004 | Junqua et al. | 704/243 |
| 6,697,564 B1 | 2/2004 | Toklu | |
| 6,708,150 B1* | 3/2004 | Hirayama et al. | 704/243 |
| 6,728,673 B2 | 4/2004 | Furuyama | |
| 6,732,369 B1* | 5/2004 | Schein et al. | 725/39 |
| 6,760,916 B2 | 7/2004 | Holtz | |
| 6,768,816 B2 | 7/2004 | Hall | |
| 6,792,407 B2 | 9/2004 | Kibre | |
| 6,816,858 B1* | 11/2004 | Coden et al. | 707/750 |
| 6,873,993 B2 | 3/2005 | Charlesworth | |
| 6,973,665 B2 | 12/2005 | Dudkiewicz | |
| 7,013,478 B1 | 3/2006 | Hendricks | |
| 7,092,496 B1* | 8/2006 | Maes et al. | 379/88.01 |
| 7,103,197 B2* | 9/2006 | Rhoads | 382/100 |
| 7,130,790 B1* | 10/2006 | Flanagan et al. | 704/2 |
| 7,146,319 B2 | 12/2006 | Hunt | |
| 7,209,640 B2 | 4/2007 | Young | |
| 7,277,851 B1* | 10/2007 | Henton | 704/235 |
| 7,293,275 B1 | 11/2007 | Krieger | |
| 7,337,116 B2 | 2/2008 | Charlesworth | |
| 7,406,408 B1* | 7/2008 | Lackey et al. | 704/8 |
| 7,472,061 B1* | 12/2008 | Alewine et al. | 704/243 |
| 7,869,999 B2* | 1/2011 | Amato et al. | 704/260 |
| 8,041,025 B2* | 10/2011 | Dolph et al. | 379/390.01 |
| 2001/0021938 A1 | 9/2001 | Fein | |
| 2002/0036694 A1* | 3/2002 | Merril | 348/220 |
| 2002/0069063 A1* | 6/2002 | Buchner et al. | 704/270 |
| 2002/0082831 A1* | 6/2002 | Hwang et al. | 704/249 |
| 2002/0161579 A1* | 10/2002 | Saindon et al. | 704/235 |
| 2003/0040899 A1* | 2/2003 | Ogilvie | 704/2 |
| 2003/0115049 A1* | 6/2003 | Beutnagel et al. | 704/220 |
| 2003/0182111 A1* | 9/2003 | Handal et al. | 704/231 |
| 2004/0003401 A1 | 1/2004 | Gutta | |
| 2004/0078809 A1 | 4/2004 | Drazin | |
| 2004/0230430 A1* | 11/2004 | Gupta et al. | 704/235 |
| 2005/0033575 A1* | 2/2005 | Schneider | 704/254 |
| 2005/0060156 A1* | 3/2005 | Corrigan et al. | 704/270.1 |
| 2005/0086705 A1* | 4/2005 | Jarman et al. | 725/136 |
| 2005/0172319 A1 | 8/2005 | Reichardt | |
| 2005/0183109 A1* | 8/2005 | Basson et al. | 725/4 |
| 2005/0187769 A1* | 8/2005 | Hwang et al. | 704/240 |
| 2006/0156326 A1 | 7/2006 | Goronzy | |
| 2006/0173683 A1* | 8/2006 | Roth et al. | 704/251 |
| 2006/0212897 A1* | 9/2006 | Li et al. | 725/32 |
| 2006/0287856 A1* | 12/2006 | He et al. | 704/256 |
| 2007/0011012 A1* | 1/2007 | Yurick et al. | 704/277 |
| 2007/0055523 A1* | 3/2007 | Yang | 704/257 |
| 2007/0106685 A1* | 5/2007 | Houh et al. | 707/102 |
| 2007/0208569 A1* | 9/2007 | Subramanian et al. | 704/270 |
| 2007/0239448 A1 | 10/2007 | Zlokarnik | |
| 2007/0245381 A1 | 10/2007 | Nagamura | |
| 2008/0040111 A1* | 2/2008 | Miyamoto et al. | 704/240 |
| 2008/0046406 A1* | 2/2008 | Seide et al. | 707/3 |
| 2008/0065383 A1 | 3/2008 | Schroeter | |
| 2008/0263578 A1 | 10/2008 | Bayer | |
| 2008/0284910 A1* | 11/2008 | Erskine et al. | 348/468 |
| 2008/0295132 A1 | 11/2008 | Icho | |
| 2009/0009661 A1* | 1/2009 | Murakami et al. | 348/468 |
| 2009/0037179 A1* | 2/2009 | Liu et al. | 704/260 |
| 2009/0244372 A1* | 10/2009 | Petronelli et al. | 348/468 |
| 2009/0287486 A1* | 11/2009 | Chang | 704/235 |
| 2012/0035917 A1* | 2/2012 | Kim et al. | 704/200.1 |
| 2014/0019133 A1* | 1/2014 | Bao et al. | 704/257 |
| 2014/0040715 A1* | 2/2014 | Younge et al. | 715/203 |
| 2014/0278421 A1* | 9/2014 | Komissarchik et al. | 704/251 |

* cited by examiner

METHODS AND APPARATUS TO GENERATE A SPEECH RECOGNITION LIBRARY

FIELD OF THE DISCLOSURE

This disclosure relates generally to speech recognition systems and, more particularly, to methods and apparatus to generate a speech recognition library for use by a speech recognition system.

BACKGROUND

Speech recognition systems allow a user to interact with a device by speaking words and/or commands. For example, when a command is spoken, the speech recognition system translates the spoken command into text that can be used and/or manipulated by the device to, for example, change a state of the device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements.

The use of the same reference symbols in different drawings indicates similar or identical items.

DETAILED DESCRIPTION OF THE DRAWINGS

Figure 1:
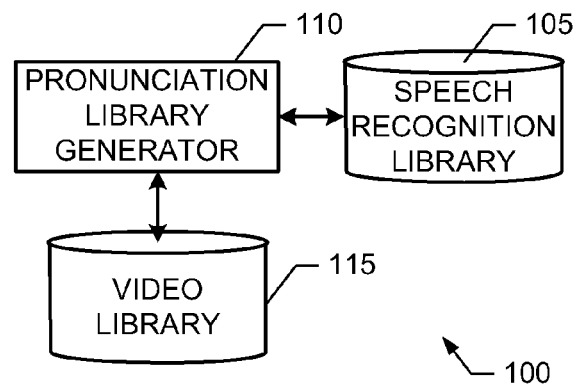
FIG. 1 is a schematic illustration of an example system to generate a speech recognition library.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Example methods and apparatus to generate a speech recognition library for use by a speech recognition system are disclosed. A disclosed example method includes identifying a plurality of video segments having closed caption data corresponding to a phrase, the plurality of video segments associated with respective ones of a plurality of audio data segments, computing a plurality of difference metrics between a baseline audio data segment associated with the phrase and respective ones of the plurality of audio data segments, selecting a set of the plurality of audio data segments based on the plurality of difference metrics, identifying a first one of the audio data segments in the set as a representative audio data segment, determining a first phonetic transcription of the representative audio data segment, and adding the first phonetic transcription to a speech recognition library when the first phonetic transcription differs from a second phonetic transcription associated with the phrase in the speech recognition library.

A disclosed example apparatus includes an audio segment selector to identify a plurality of video segments having closed caption data corresponding to a phrase, the plurality of video segments associated with respective ones of a plurality of audio data segments, an audio comparator to compute a plurality of difference metrics between a baseline audio data segment associated with the phrase and respective ones of the plurality of audio data segments, an audio segment grouper to identify a set of the plurality of audio data segments based on the plurality of difference metrics, a phonetic transcriber to determine a first phonetic transcription corresponding to the set of audio data segments, and a database manager to add the first phonetic transcription to a speech recognition library when the first phonetic transcription differs from a second phonetic transcription associated with the phrase in the speech recognition library.

Another disclosed example method includes identifying a plurality of video segments having closed caption data corresponding to a phrase, the plurality of video segments associated with respective ones of a plurality of audio data segments, determining a plurality of phonetic transcriptions for respective ones of the plurality of audio data segments, identifying a set of the plurality of audio data segments having a first phonetic transcription different from a second phonetic transcription associated with the phrase in a speech recognition library, and adding the first phonetic transcription to the speech recognition library.

The example speech recognition libraries described herein can be used by any number and/or type(s) of speech recognition systems, and/or any number and/or type(s) of systems having an included speech recognition system. Example systems that incorporate a speech recognition system are described in U.S. patent application Ser. No. 12/120,0368, entitled "Methods and Apparatus to Generate Relevance Rankings for Use By A Program Selector of A Media Presentation System," which was filed on May 14, 2008; U.S. patent application Ser. No. 11/520,092, entitled "Authoring System for IPTV Network," which was filed on Sep. 12, 2006; U.S. patent application Ser. No. 11/1475,551, entitled "Biometric and Speech Recognition System and Method," which was filed on Jun. 27, 2006; U.S. patent application Ser. No. 11/226,646, entitled "Wireless Multimodal Voice Browser for Wireline-based IPTV Services," which was filed on Sep. 14, 2005; U.S. patent application Ser. No. 11/106,361, entitled "System and Method of Locating and Providing Video Content via an IPTV Network," which was filed on Apr. 14, 2005; U.S. patent application Ser. No. 11/866,873, entitled "System for Managing Media Services," which was filed on Oct. 3, 2007; and U.S. patent application Ser. No. 11/106,016, entitled "Wireless Device to Access Network-based Voice-Activated Services Using Distributed Speech Recognition," which was filed on Apr. 14, 2005. U.S. patent application Ser. No. 12/120,368, U.S. patent application Ser. No. 11/520,092, U.S. patent application Ser. No. 11/475,551, U.S. patent application Ser. No. 11/226,646, U.S. patent application Ser. No. 11/106,361, U.S. patent application Ser. No. 11/866,873, and U.S. patent application Ser. No. 11/106, 016 are hereby incorporated by reference in their entirety.

FIG. 1 is a schematic illustration of an example system 100 to generate a speech recognition library 105 for use by a speech recognition system (not shown). To generate the example speech recognition library 105, the example system 100 of FIG. 1 includes a pronunciation library generator 110. The example pronunciation generator 110 of FIG. 1 uses closed caption information associated with audio tracks of a video library 115 to generate the speech recognition library 105. For a phrase of one or more words (e.g., "Alan Alda"), the example pronunciation library generator 110 uses closed caption information to identify audio tracks that contain the phrase. The identified audio tracks are then analyzed to identify one or more pronunciations of the phrase (e.g., "\Alan-ALL-da\" versus "\Alan-el-da\"). The pronunciations library generator 110 associates each of the identified pronunciations with the phrase in the speech recognition library 105. By analyzing the video library 115, the example pronunciation library generator 110 generates a speech recognition library 105 that encompasses as many distinct pronunciations of a given phrase as possible. For example, a proper name or location (e.g., "Alan Alda," "Beijing," "Qatar," etc.) may be pronounced differently depending on the nationality or geographic location of the speaker. By incorporating distinct pronunciations of a phrase in the speech recognition library 105, a speech recognition system that uses the example speech recognition library 105 is able to more often or more correctly determine what phase is spoken regardless of how the phrase is pronounced. An example data structure that may be used to implement the example speech recognition library 105 is described below in connection with FIG. 3. An example manner of implementing the example pronunciation library generator 110 of FIG. 1 is described below in connection with FIG. 4.

Figure 2:
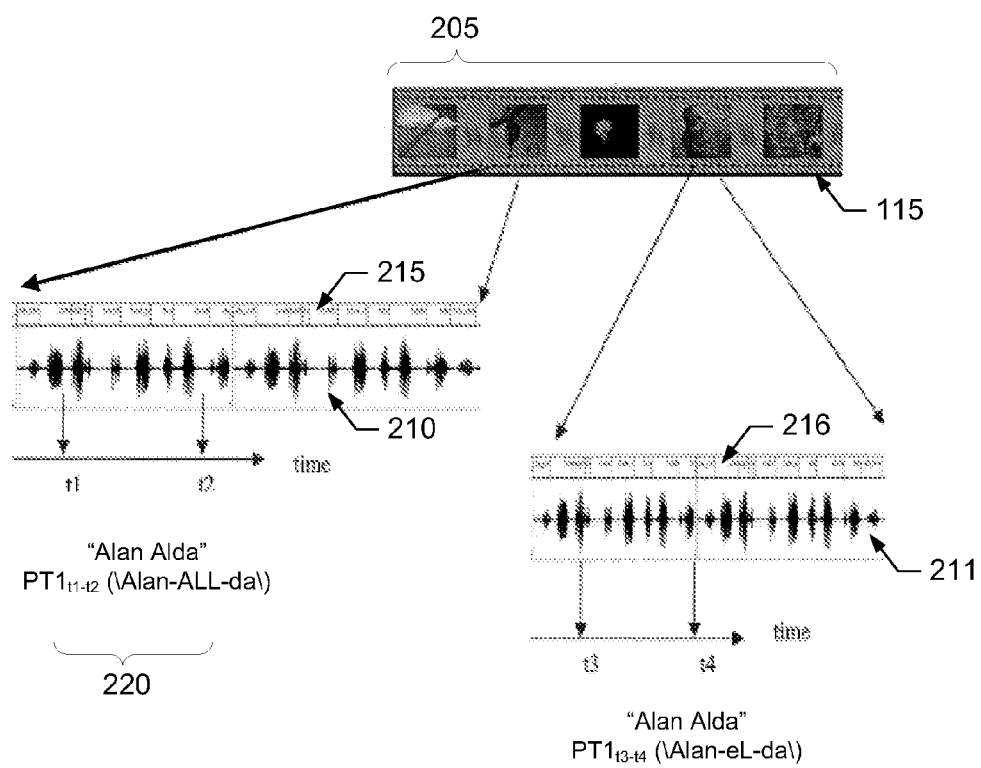
FIG. 2 illustrates example audio data segments having closed caption information matching a phrase.

As shown in FIG. 2, the example video library 115 contains a plurality of videos and/or video clips 205 (television shows, movies, newscasts, documentaries, sport shows, home movies, etc.) received from and/or associated with any number and/or type(s) of sources (e.g., broadcasters, television stations, governments, schools, studios, individuals, web sites, countries, etc.). Each of the example videos 205 has an associated audio track, two of which are designated at reference numerals 210 and 211. The example audio tracks 210 and 211 of FIG. 2 have respective closed caption information 215 and 216 corresponding to the various portions of the audio tracks 210 and 211. In the illustrated example of FIG. 2, a first audio data segment 220 associated with the example audio track 210 and a second audio data segment 221 associated with the example audio track 211 both correspond to the same closed caption text "Alan Alda." However, the example audio data segments 220 and 221 represent the same or different pronunciations of the phrase "Alan Alda." The example audio data segment 220 of FIG. 2 can be delimited and/or identified by times t1 and t2 of the audio track 210.

Figure 3:
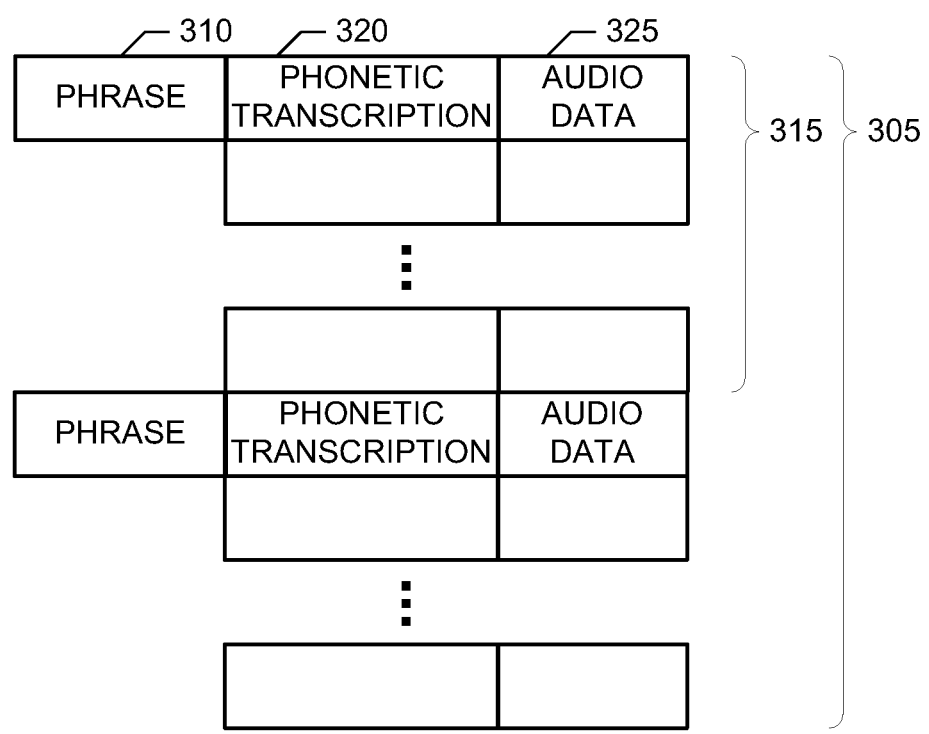
FIG. 3 illustrates an example data structure that may be used to implement the example speech recognition library of FIG. 1.

FIG. 3 illustrates an example data structure that may be used to implement the example speech recognition library 105 of FIG. 1. The example data structure of FIG. 3 includes a plurality of entries 305 for respective ones of a plurality of phrases. To represent a phrase, each of the example entries 305 of FIG. 3 includes a phrase field 310. Each of the example phrase fields 310 of FIG. 3 contains one or more letters and/or words that represent, for example, a name, a location, and/or a title.

To represent pronunciations, each of the example entries 305 includes a plurality of pronunciation entries 315 for respective ones of pronunciations of the phrase represented by the field 310. To store a pronunciation, each of the example pronunciation entries 315 of FIG. 3 includes a phonetic transcription field 320. Each of the example phonetic transcription fields 320 of FIG. 3 contains one or more letters, symbols and/or annotations that collectively represent a phonetic pronunciation of the phrase represented by the field 310. For example, the field 320 may contain "\Alan-el-da\" for the name "Alan Alda."

To store audio data, each of the example pronunciation entries 315 of FIG. 3 includes an audio data field 325. Each of the example audio data fields 325 of FIG. 3 stores and/or represents audio data corresponding to the phonetic transcription 320. The example audio data 325 may be stored, for example, as linear predictive coding (LPC) encoded audio data.

In some examples, when a new phrase 310 is added to the speech recognition library 105 (e.g., a new entry 305 added to the library 105), corresponding baseline audio data 325 and a baseline phonetic transcription 320 are automatically created using a text-to-speech (TTS) synthesis engine. Additionally or alternatively, the baseline audio data 325 can be recorded as the phrase 310 is spoken by a person, and the baseline phonetic transcription 320 automatically created from the recorded audio data 325. For example, a user may use a computer system to specify (e.g., type) a phrase 310 to be added to the speech recognition library 105, and then use, for example, a microphone to record the baseline audio data 325. The example computer system implements a phonetic transcriber, such as the example phonetic transcriber 425 of FIG. 4, to generate the baseline phonetic transcription 320 based on the recorded baseline audio data 325.

While an example data structure that can be used to implement the example speech recognition library 105 of FIG. 1 is illustrated in FIG. 3, a speech recognition library 105 may be implemented using any number and/or type(s) of other and/or additional data structures, fields and/or data. Further, the fields and/or data illustrated in FIG. 3 may be combined, divided, re-arranged, eliminated and/or implemented in any way. Moreover, the example data structure of FIG. 3 may include fields and/or data in addition to, or instead of, those illustrated in FIG. 3, and/or may include more than one of any or all of the illustrated fields and/or data.

Figure 4:
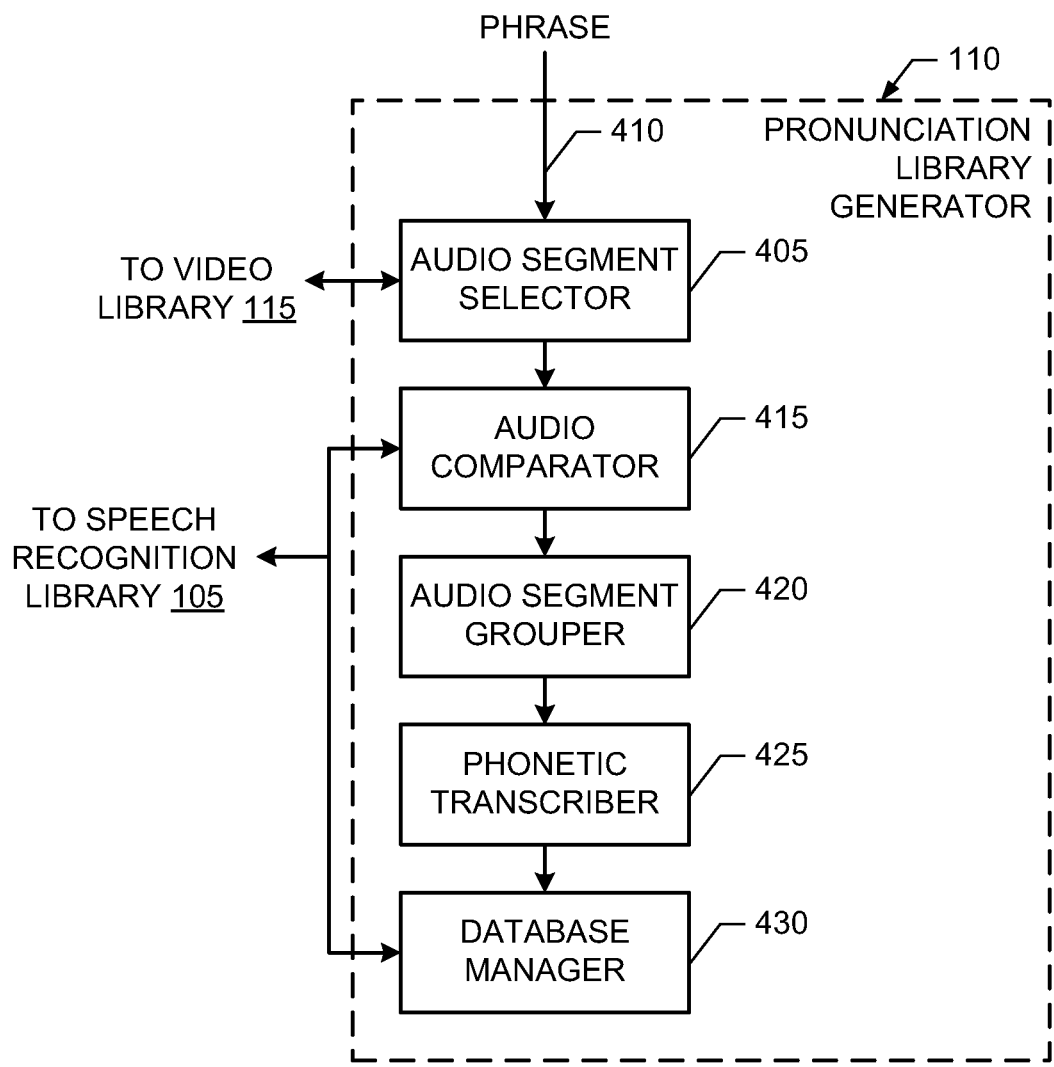
FIG. 4 illustrates an example manner of implementing the example pronunciation library generator of FIG. 1.

FIG. 4 illustrates an example manner of implementing the example pronunciation library generator 110 of FIG. 1. To select audio data segments from, for example, one or more audio/video programs, the example pronunciation library generator 110 of FIG. 4 includes an audio segment selector 405. The example audio segment selector 405 of FIG. 4 searches the video library 115 to identify programs having closed caption information that match a presently considered phrase 410. The phrase 410 may, for example, be provided to the pronunciation library generator 110 by a user and/or be automatically identified from, for example, an electronic program guide. The audio segment selector 405 further identifies the audio data segments (e.g., 5 or 10 second intervals) of the identified programs that roughly correspond to the phrase 410. The identified audio data segments are then delimited (e.g., starting and ending times identified) to more precisely identify the specific portions of the identified audio data segments that correspond to the phrase 410.

To compare the identified audio data segments with pronunciations already stored in the speech recognition library 105, the example pronunciation library generator 110 of FIG. 4 includes an audio comparator 415. The example audio comparator 415 of FIG. 4 compares each of the identified audio data segments with audio data previously associated with the phrase 410 in the speech recognition library 105 (e.g., the example audio data 325 of FIG. 3). For example, the audio comparator 415 can compute a difference metric between audio data segments. Example difference metrics include, but are not limited to, a mean-squared error, a difference in formants (i.e., sounds made by the human vocal tract), an LPC coefficient difference, or any combination thereof.

To group identified audio data segments, the example pronunciation library generator 110 of FIG. 4 includes an audio segment grouper 420. The example audio segment grouper 420 of FIG. 4 groups the identified audio data segments into one or more sets based on their differences. For example, a set may contain identified audio data segments that each differ from a baseline audio segment 325 in a similar manner. For example, they may all contain one or more particular formants that differ from the baseline audio segment 325.

To perform phonetic transcriptions, the example pronunciation library generator 110 of FIG. 4 includes a phonetic transcriber 425. For each set of audio data segments identified by the example audio segment grouper 420, the example phonetic transcriber 425 performs a phonetic description of a representative one of the group. A representative one of each group may be selected by, for example, identifying the audio data segment that has the smallest average difference when compared to all the other members of the group.

To manage the speech recognition library 105, the example pronunciation library generator 110 of FIG. 4 includes a database manager 430. For each group identified by the example audio segment grouper 420, the example database manager 430 compares the corresponding representative phonetic transcription with the phonetic transcriptions 320 previously associated with the phrase 410 in the speech recognition library 105. If the representative phonetic transcription differs from those previously associated with the phrase 410, the example database manager 430 adds the new phonetic transcription to the speech recognition library 105 by, for example, adding a new transcription entry 315 to a phrase entry 305 (FIG. 3). The example database manager 430 also adds the audio data segment 325 associated with the representative phonetic transcription for the group to the new transcription entry 315.

The example pronunciation library generator 110 of FIG. 4 may be operated when, for example, additional video and/or video clips are added to the video library 115, and/or when a new phrase 410 has been added to the speech recognition library 105. Thus, the same phrase 410 may be processed multiple times as, for example, new programs are added to the video library 115. Additionally or alternatively, the example pronunciation library generator 110 may be operated iteratively to refine the speech recognition library 105 such that, for example, the audio data 325 represents a more representative recording of the corresponding phonetic transcription 320. For example, a phrase 310 and baseline audio data 325 created using a TTS engine may initially be added to the speech recognition library 105. The example pronunciation library generator 110 may then be operated to identify more representative audio data for the phrase 410 based on closed caption information contained in the video library 115. The more representative audio data is used to replace the original baseline audio data 325 with audio data spoken by an actual person from the video library 114, and/or to add additional pronunciations of the phrase 410 to the library 105, if any are present in the video library 115.

While an example manner of implementing the example pronunciation library generator 110 of FIG. 1 has been illustrated in FIG. 4, one or more of the interfaces, data structures, elements, processes and/or devices illustrated in FIG. 4 may be combined, divided, re-arranged, omitted, eliminated and/or implemented in any other way. For example, the phonetic transcriber 425 may perform a phonetic transcription for each of the audio data segments identified by the audio segment selector 405, and the thus generated phonetic transcriptions may be used by the audio comparator 415 and the audio segment grouper 420 to compare and group the identified audio data segments. Further, the example audio segment selector 405, the example audio comparator 415, the example audio segment grouper 420, the example phonetic transcriber 425, the example database manager 430 and/or, more generally, the example pronunciation library generator 110 of FIG. 4 may be implemented by hardware, software, firmware and/or any combination of hardware, software and/or firmware. Thus, for example, any or all of the example audio segment selector 405, the example audio comparator 415, the example audio segment grouper 420, the example phonetic transcriber 425, the example database manager 430 and/or, more generally, the example pronunciation library generator 110 may be implemented by one or more circuit(s), programmable processor(s), application specific integrated circuit(s) (ASIC(s)), programmable logic device(s) (PLD(s)) and/or field-programmable logic device(s) (FPLD(s)), etc. When any of the appended claims are read to cover a purely software and/or firmware implementation, at least one of the example audio segment selector 410, the example audio comparator 415, the example audio segment grouper 420, the example phonetic transcriber 425, the example database manager 430 and/or, more generally, the example pronunciation library generator 110 are hereby expressly defined to include a tangible medium such as a memory, a digital versatile disc (DVD), a compact disc (CD), etc. storing the software and/or firmware. Further still, a pronunciation library generator may include interfaces, data structures, elements, processes and/or devices instead of, or in addition to, those illustrated in FIG. 4 and/or may include more than one of any or all of the illustrated interfaces, data structures, elements, processes and/or devices.

Figure 5:
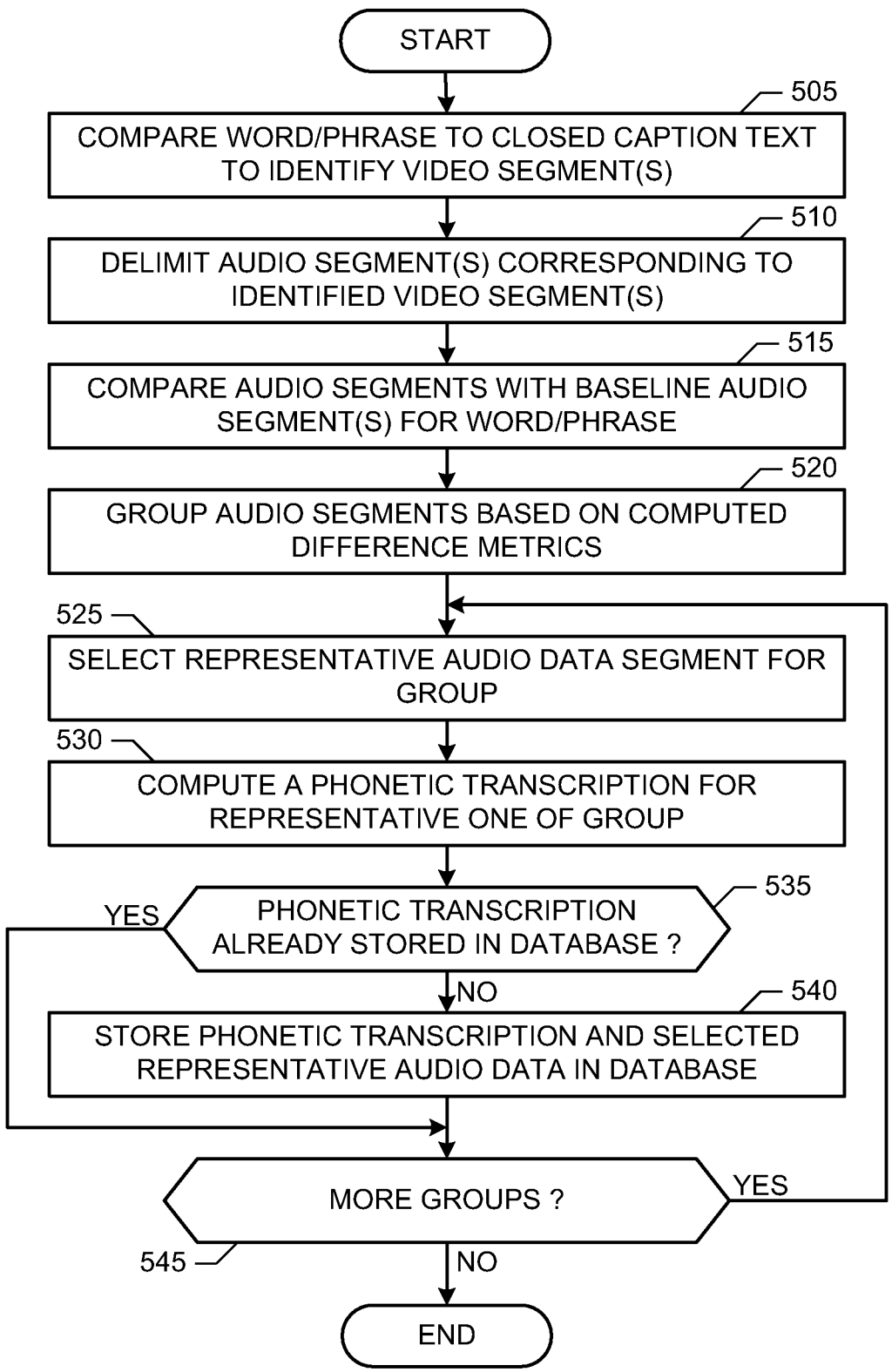
FIG. 5 is a flowchart representative of example machine accessible instructions that may be executed by, for example, a processor to implement any or all of the example pronunciation library generator of FIGS. 1 and/or 4.
Figure 6:
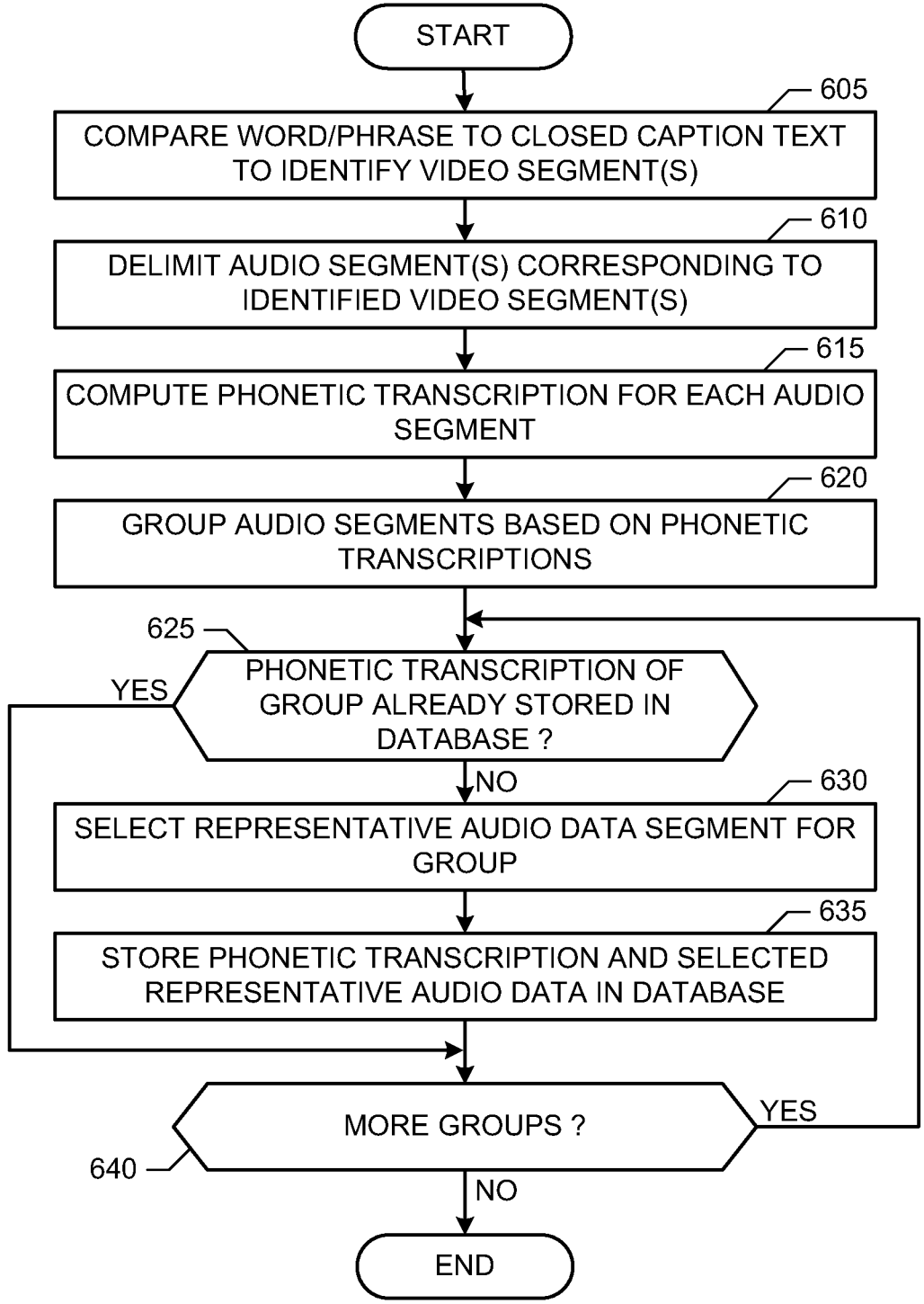
FIG. 6 is a flowchart representative of additional or alternative example machine accessible instructions that may be executed by, for example, a processor to implement any or all of the example pronunciation library generator of FIGS. 1 and/or 4.

FIGS. 5 and 6 illustrates example machine accessible instructions that may be executed to implement the example pronunciation library generator 110 of FIGS. 1 and/or 4. The example machine accessible instructions of FIGS. 5 and/or 6 may be carried out by a processor, a controller and/or any other suitable processing device. For example, the example machine accessible instructions of FIGS. 5 and/or 6 may be embodied in coded instructions stored on a tangible medium such as a flash memory, a read-only memory (ROM) and/or random-access memory (RAM) associated with a processor (e.g., the example processor P105 discussed below in connection with FIG. 7). Alternatively, some or all of the example machine accessible instructions of FIGS. 5 and/or 6 may be implemented using any combination(s) of ASIC(s), PLD(s), FPLD(s), discrete logic, hardware, firmware, etc. Also, some or all of the example machine accessible instructions of FIGS. 5 and/or 6 may be implemented manually or as any combination of any of the foregoing techniques, for example, any combination of firmware, software, discrete logic and/or hardware. Further, although the example operations of FIGS. 5 and 6 are described with reference to the flowcharts of FIGS. 5 and 6, many other methods of implementing the operations of FIGS. 5 and/or 6 may be employed. For example, the order of execution of the blocks may be changed, and/or one or more of the blocks described may be changed, eliminated, sub-divided, or combined. Additionally, any or all of the example machine accessible instructions of FIGS. 5 and/or 6 may be carried out sequentially and/or carried out in parallel by, for example, separate processing threads, processors, devices, discrete logic, circuits, etc.

The example machine accessible instructions of FIG. 5 begin with the example audio segment selector 405 of FIG. 4 comparing a phrase with closed caption text of the example video library 115 to identify one or more segments of video having closed caption text matching the phrase (block 505). The phrase may be provided by, for example, a user of the pronunciation library generator 110. The audio segment selector 405 then delimits the portion(s) of the audio tracks associated with the identified video segments that correspond to the closed caption text (block 510).

The example audio comparator 415 of FIG. 4 compares each of the delimited audio data segments with audio data associated with the phrase in the speech recognition library 105 (e.g., baseline audio data computed from the phrase using a TTS module and/or baseline audio data identified using the example process of FIG. 5) (block 515). The example audio segment grouper 420 groups the audio data segments based on the differences (block 520).

The example phonetic transcriber 425 of FIG. 4 selects a representative one of a first set of audio data segments (block 525) and computes a phonetic transcription of the selected representative audio data segment (block 530). If the representative phonetic transcription is not the same as a phonetic transcription already associated with the phrase in the library 105 (block 535), the example database manager 430 adds the phonetic transcription to the speech recognition library 105 (block 540). If there are more groups to process (block 545), control returns to block 525 to process the next group. If there are no more groups to process (block 545), control exits from the example machine accessible instructions of FIG. 5.

Returning to block 535, if the phonetic transcription is already associated with the phrase in the library (block 535), control proceeds to block 545 to determine whether there are more groups to process.

In comparison to the example machine accessible instructions of FIG. 5, the example machine accessible instructions of FIG. 6 group identified audio data segments based on their phonetic transcriptions rather than based on computed difference metrics. The example machine accessible instructions of FIG. 6 begin with the example audio segment selector 405 of FIG. 4 comparing a phrase with closed caption text of the example video library 115 to identify one or more segments of video having closed caption text matching the phrase (block 605). The audio segment selector 405 then delimits the portion(s) of the audio tracks associated with the identified video segments that correspond to the closed caption text (block 610).

The example phonetic transcriber 425 of FIG. 4 computes a phonetic transcription for each of the delimited audio data segments (block 615). The example audio segment grouper 420 groups the audio data segments based on the phonetic transcriptions (block 620). For example, each group would contain all delimited audio data segments having the same phonetic transcription.

If the phonetic transcription of a first group is not already associated with the phrase in the speech recognition library 105 (block 625), the audio comparator 415 selects a representative one of the group of audio data segments (block 630), and the database manager 430 adds the phonetic transcription of the presently considered group and the representative audio data segment to the library 105 (block 635). If there are more groups to process (block 640), control returns to block 625 to process the next group. If there are no more groups to process (block 640), control exits from the example machine accessible instructions of FIG. 6.

Returning to block 625, if the phonetic transcription of the presently considered group is already associated with the phrase in the library (block 625), control proceeds to block 640 to determine whether there are more groups to process.

Figure 7:
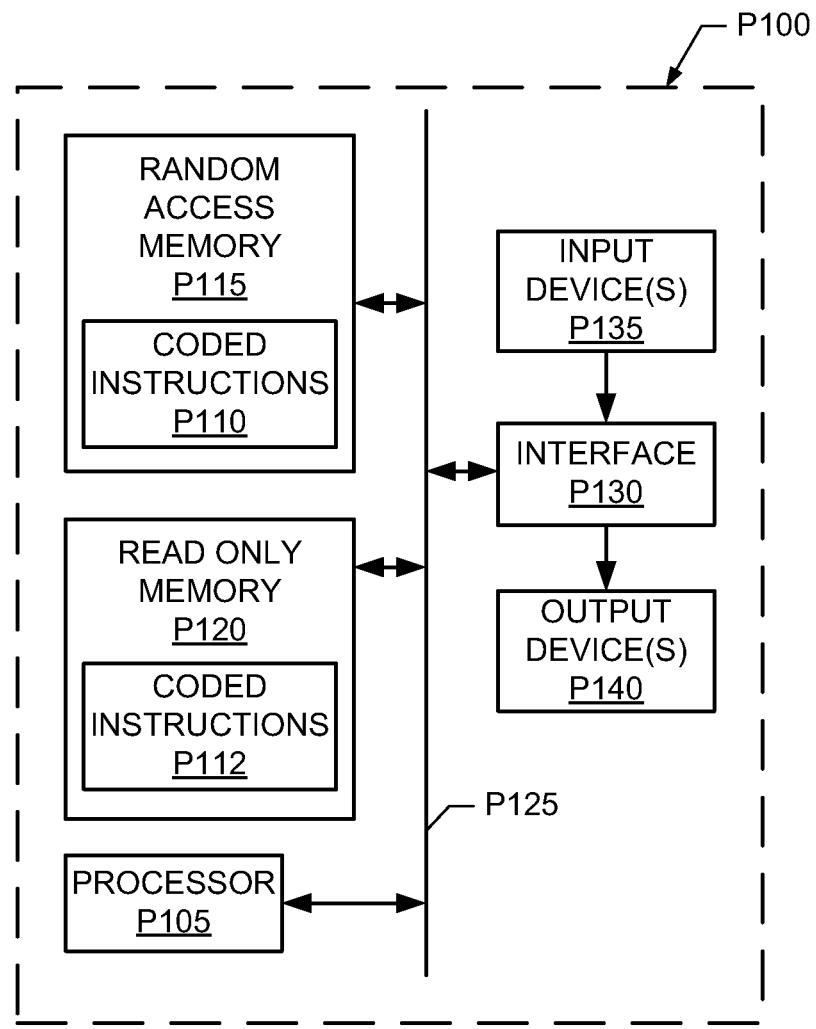
FIG. 7 is a schematic illustration of an example processor platform that may be used and/or programmed to execute the example machine accessible instructions of FIGS. 5 and/or 6 to implement any of all of the example methods and apparatus described herein.

FIG. 7 is a schematic diagram of an example processor platform P100 that may be used and/or programmed to implement any or all of the example pronunciation library generators 110 disclosed herein. For example, the processor platform P100 can be implemented by one or more general-purpose processors, processor cores, microcontrollers, etc.

The processor platform P100 of the example of FIG. 7 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example machine accessible instructions of FIGS. 5 and/or 5 to implement the example methods and apparatus described herein.

The processor P105 is in communication with the main memory (including a ROM P120 and/or the RAM P115) via a bus P125. The RAM P115 may be implemented by dynamic random-access memory (DRAM), synchronous dynamic random-access memory (SDRAM), and/or any other type of RAM device, and ROM may be implemented by flash memory and/or any other desired type of memory device. Access to the memory P115 and the memory P120 may be controlled by a memory controller (not shown). The memory P115, P120 may be used to, for example, implement the example video library 115 and/or the example speech recognition library 105.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Of course, the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A device, comprising:
   a memory to store instructions; and
   a processor coupled to the memory, wherein responsive to executing the instructions, the processor performs operations comprising:
      receiving video media content, wherein the video media content comprises images, audio content, and closed captioning of text from the audio content;
      detecting an occurrence of a textual phrase in the closed captioning of the video media content as a detected occurrence;
      selecting an audio segment from the audio content of the media content as a selected audio segment, wherein the selected audio segment corresponds to the detected occurrence of the textual phrase in the closed captioning;
      selecting from a speech recognition library an audio pronunciation associated with the textual phrase, wherein the speech recognition library comprises a group of identified audio segments, wherein the group of identified audio segments comprises a baseline audio pronunciation and collected audio pronunciations of the textual phrase;
      comparing the selected audio segment with the group of identified audio segments from the speech recognition library;
      determining if an audio pronunciation of the selected audio segment differs from the baseline audio pronunciation from the speech recognition library;
      responsive to determining that the audio pronunciation of the selected audio segment differs from the baseline audio pronunciation, generating a phonetic transcription of the audio pronunciation of the selected audio segment; and
      adding the phonetic transcription and the textual phrase to the group of identified audio segments in the speech recognition library to populate the collected audio pronunciations of the selected audio segment.

2. The device as defined in claim 1, wherein the operations further comprise adding the audio pronunciation of the selected audio segment to the speech recognition library in relational association with the textual phrase.

3. The device as defined in claim 1, wherein the operations further comprise:
   detecting a second occurrence of the textual phrase in the closed captioning as a detected second occurrence;
   selecting a second audio segment from the audio of the media content as a selected second audio segment, wherein the selected second audio segment corresponds to the detected second occurrence of the textual phrase;
   comparing the selected second audio segment with the baseline audio pronunciation;
   generating a group of audio difference metrics by comparing the selected audio segment and the selected second audio segment to the baseline audio pronunciation;
   identifying by way of the group of audio difference metrics if the selected audio segment and the selected second audio segment have similar audio pronunciations, wherein the similar audio pronunciations differ from the baseline audio pronunciation; and identifying a representative audio segment of the selected audio segment and the selected second audio segment, wherein the phonetic transcription of the audio pronunciation of the selected audio segment and the selected second audio segment are generated from the representative audio segment.

4. The device as defined in claim 3, wherein the operations comprise adding the representative audio segment to the speech recognition library in relational association with the textual phrase.

5. The device as defined in claim 3, wherein the audio difference metrics comprise one of a mean-square error, a difference in formants, or a linear predictive coding coefficient difference.

6. The device as defined in claim 1, wherein the operations comprise comparing the selected audio segment to a second baseline audio pronunciation associated with the textual phrase from the speech recognition library.

7. The device as defined in claim 1, wherein the operations comprise generating a phonetic transcription for the selected audio segment and wherein the selected audio segment is compared to the baseline audio pronunciation by comparing the phonetic transcription of the selected audio segment to a baseline phonetic transcription of the baseline audio pronunciation.

8. An apparatus, comprising
a memory to store instructions; and
a processor coupled to the memory, wherein responsive to executing the instructions, the processor performs operations comprising:
identifying an audio data segment of a video data segment associated with a closed caption textual phrase from the audio data segment;
selecting from a speech recognition library a baseline audio pronunciation associated with the textual phrase, wherein the speech recognition library comprises the baseline audio pronunciation and collected audio pronunciations of the textual phrase;
calculating a difference metric between the audio data segment and the baseline audio pronunciation associated with the textual phrase from a speech recognition library;
determining a first phonetic transcription of the audio data segment responsive to the difference metric indicating a difference between the audio data segment and the baseline audio pronunciation;
determining that the first phonetic transcription differs from a baseline phonetic transcription of the baseline audio pronunciation; and
responsive to the determining that the first phonetic transcription differs from the baseline phonetic transcription, populating the collected audio pronunciations for the textual phrase in the speech recognition library, wherein the collected audio pronunciation includes the first phonetic transcription and the audio data segment of the textual phrase.

9. The apparatus as defined in claim 8, wherein the textual phrase comprises a single word.

10. An apparatus as defined in claim 8, wherein the speech recognition library comprises:
a first field representing the textual phrase;
a second field associated with the first field representing the baseline audio pronunciation; and
a third field associated with the first field representing the baseline phonetic transcription.

11. A non-transitory machine-readable storage medium, comprising instructions, wherein responsive to executing the instructions, a processor performs operations comprising:
comparing audio segments matched to a textual phrase in closed captioning from a video content stream to a baseline audio pronunciation, wherein the baseline audio pronunciation is selected from a speech recognition library and is associated with the textual phrase in the speech recognition library, wherein the speech recognition library comprises the baseline audio pronunciation and collected audio pronunciations of the textual phrase;
identifying one of the audio segments having a pronunciation that differs from the baseline audio pronunciation of the textual phrase as an identified audio segment of the textual phrase;
generating a phonetic transcription of the pronunciation of the identified audio segment from close captioning data of the video content stream; and
adding the phonetic transcription of the pronunciation of the identified audio segment to the speech recognition library to the collected audio pronunciations of the textual phrase to populate the speech recognition library.

12. The non-transitory machine-readable storage medium described in claim 11, wherein the operations comprise receiving the textual phrase from an electronic program guide, wherein the collected audio pronunciations of the textual phrase are generated by recording user input of the textual phrase.

13. The non-transitory machine-readable storage medium described in claim 11, wherein the operations comprise adding the identified audio segment to the speech recognition library in relational association with the textual phrase.

14. A method, comprising:
causing a processor to perform a phonetic transcription of an audio segment corresponding to a textual phrase in closed captioning from a video media source responsive to detecting a difference in pronunciation between the audio segment and a baseline audio pronunciation associated with the textual phrase from a speech recognition library, wherein the speech recognition library comprises the baseline audio pronunciation and collected audio pronunciations of the textual phrase, and wherein the video media source comprises image data, audio data, and closed captioning data; and
responsive to detecting a difference in the pronunciation;
causing the processor to store the phonetic transcription of the audio segment in the speech recognition library as one of the collected audio pronunciations to populate the speech recognition library; and
adding the audio segment corresponding to the textual phrase to the speech recognition library to populate the speech recognition library.

15. The method as defined in claim 14, wherein the textual phrase comprises a single word, and wherein the difference in pronunciation is of a single syllable of the single word.

16. The method as defined in claim 14, wherein the textual phrase comprises one of a proper name, a title, or a location.

17. The method as defined in claim 14, wherein the textual phrase is received from an electronic program guide.

18. The method as defined in claim 14, further comprising:
detecting occurrences of the textual phrase in the closed captioning of the media source; and
selecting the audio segment from the media source where the textual phrase is detected in the closed captioning.

\* \* \* \* \*